(12) United States Patent
Shimada

(10) Patent No.: US 8,804,250 B2
(45) Date of Patent: Aug. 12, 2014

(54) ZOOM LENS, OPTICAL APPARATUS AND METHOD FOR MANUFACTURING ZOOM LENS

(75) Inventor: Toshiyuki Shimada, Kawasaki (JP)

(73) Assignee: Nikon Corporation, Tokyo (JP)

( * ) Notice: Subject to any disclaimer, the term of this patent is extended or adjusted under 35 U.S.C. 154(b) by 192 days.

(21) Appl. No.: 13/358,359

(22) Filed: Jan. 25, 2012

(65) Prior Publication Data

US 2012/0188653 A1 Jul. 26, 2012

(30) Foreign Application Priority Data

Jan. 26, 2011 (JP) ................. 2011-013780
Jan. 17, 2012 (JP) ................. 2012-007342

(51) Int. Cl.
*G02B 15/177* (2006.01)
(52) U.S. Cl.
CPC .................. *G02B 15/177* (2013.01)
USPC ........................ 359/689; 359/682
(58) Field of Classification Search
CPC .................................... G02B 15/177
USPC ......................... 359/689, 686, 682
See application file for complete search history.

(56) References Cited

U.S. PATENT DOCUMENTS

| 2006/0056067 A1 | 3/2006 | Yanai et al. |
| 2006/0083504 A1 | 4/2006 | Matsusaka |
| 2007/0279759 A1 | 12/2007 | Hozumi et al. |
| 2010/0103531 A1* | 4/2010 | Shinohara ............... 359/676 |
| 2010/0128363 A1 | 5/2010 | Yamano et al. |
| 2010/0253830 A1 | 10/2010 | Iwasawa |
| 2010/0254023 A1 | 10/2010 | Ito |

FOREIGN PATENT DOCUMENTS

| EP | 2 075 614 A2 | 7/2009 |
| JP | 2010-243637 A | 10/2010 |

OTHER PUBLICATIONS

Extended European Search Report from European Patent Application No. 12152688.3, Apr. 27, 2012.

* cited by examiner

*Primary Examiner* — Zachary Wilkes
(74) *Attorney, Agent, or Firm* — Miles & Stockbridge P.C.

(57) ABSTRACT

A zoom lens ZL having, in order from an object: a first lens group G1 having negative refractive power; a second lens group G2 having positive refractive power; and a third lens group G3 having positive refractive power, wherein, upon zooming from the wide-angle end state to the telephoto end state, at least the first lens group G1 and the second lens group G2 move along the optical axis so that the distance between the first lens group G1 and the second lens group G2 decreases, and the distance between the second lens group G2 and the third lens group G3 increases, the lens closest to the object in the second lens group G2 is a positive lens, and the object side lens surface of this positive lens is an aspherical surface of which radius of curvature increases in a direction from the optical axis to the periphery of the lens.

17 Claims, 14 Drawing Sheets

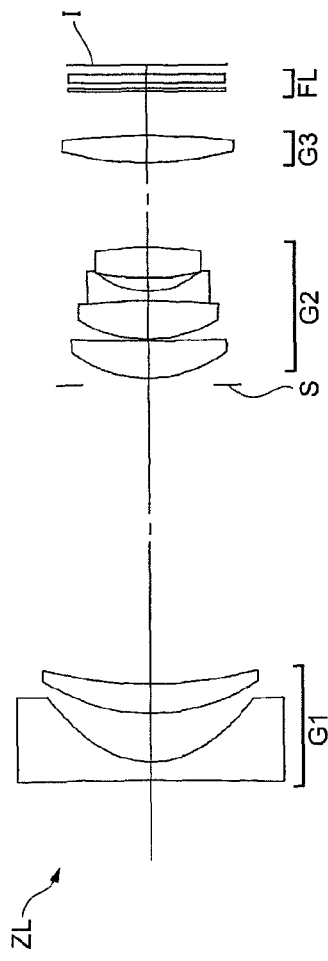
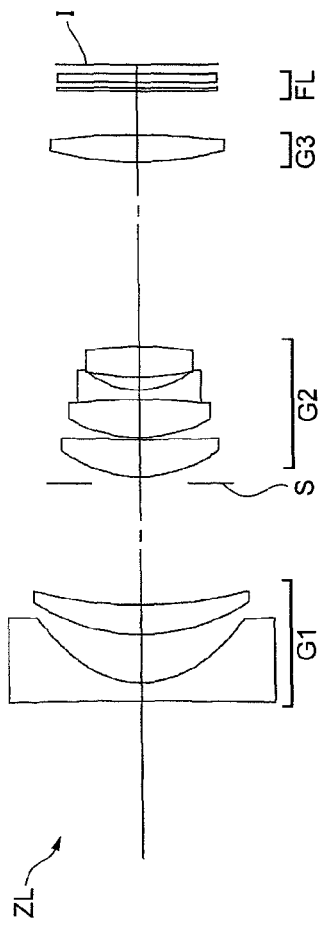
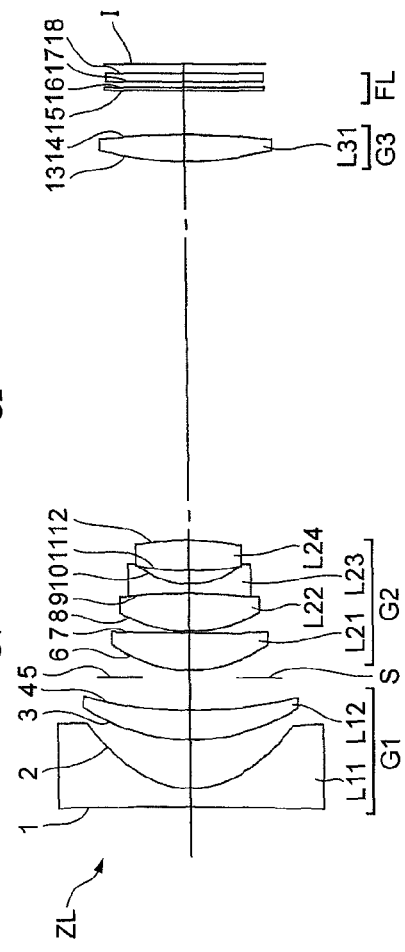
FIG.1A
FIG.1B
FIG.1C

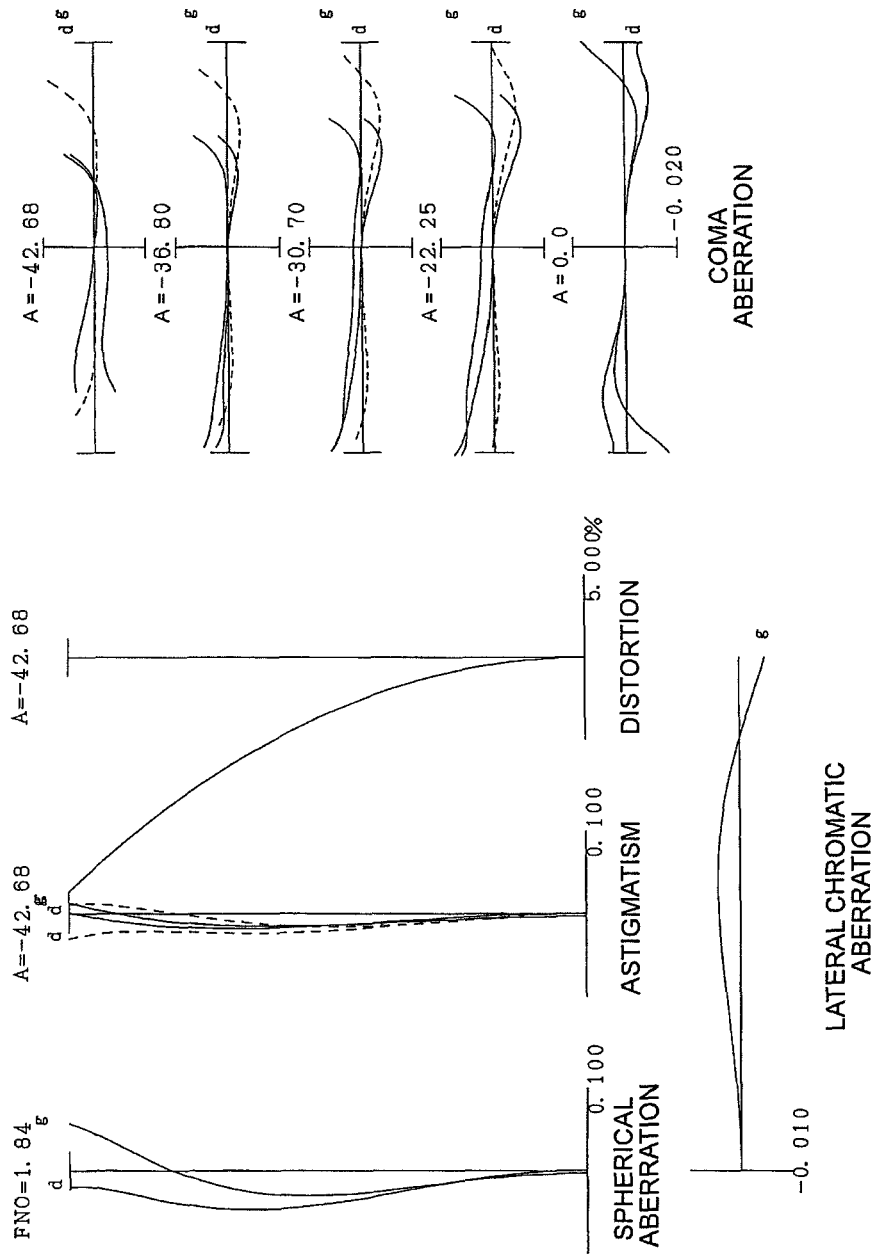

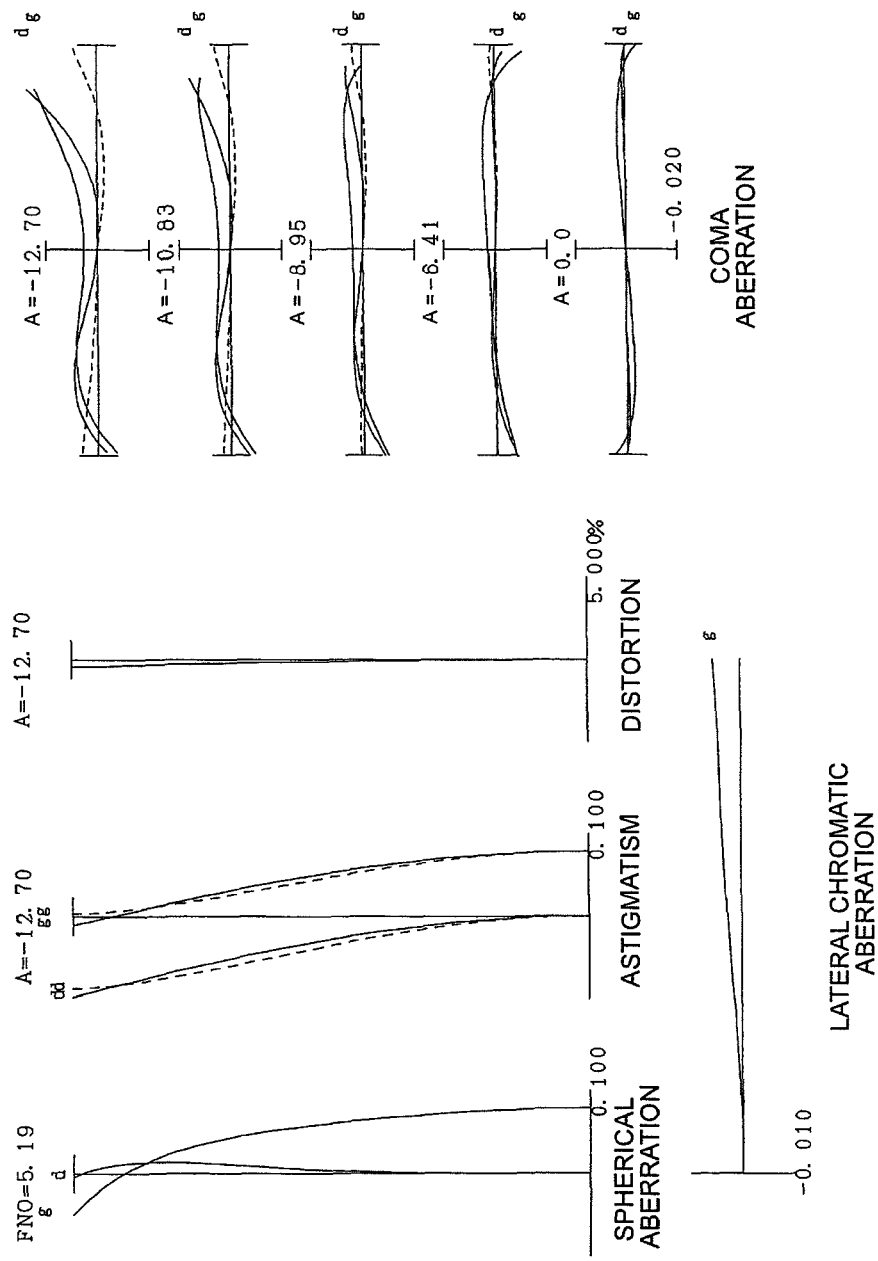

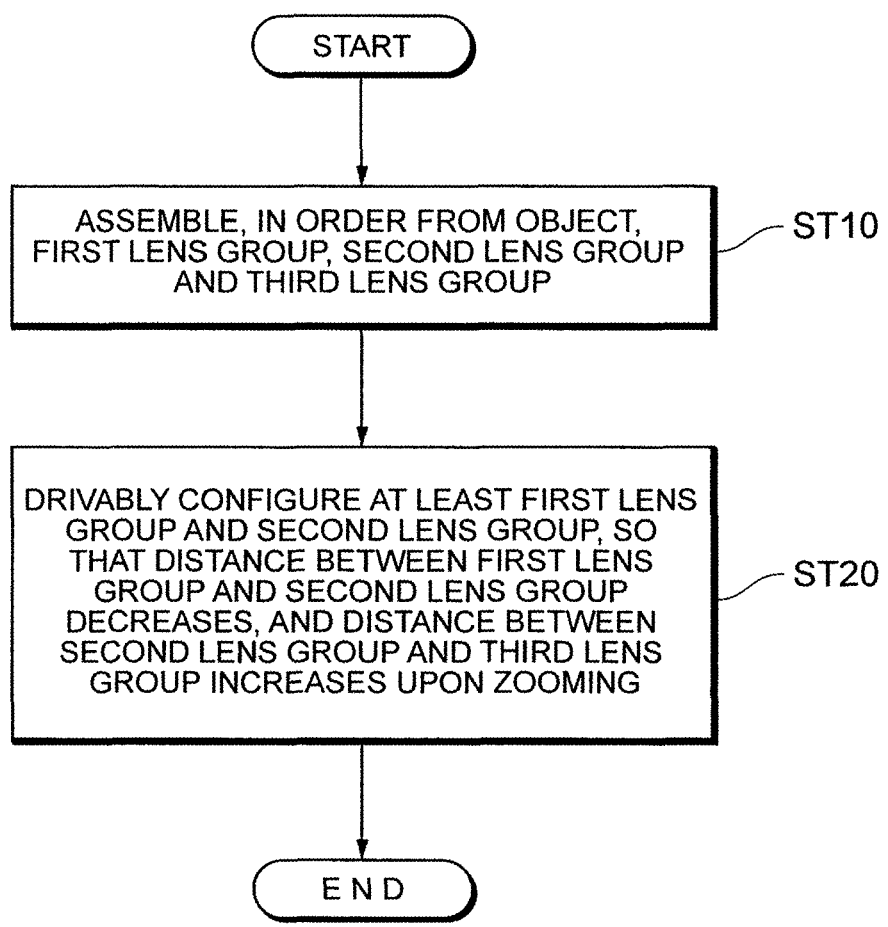

ZOOM LENS, OPTICAL APPARATUS AND METHOD FOR MANUFACTURING ZOOM LENS

RELATED APPLICATIONS

This invention claims the benefit of Japanese Patent Applications Nos. 2011-013780 and 2012-007342 which are hereby incorporated by reference.

TECHNICAL FIELD

The present invention relates to a zoom lens and an optical apparatus, which are ideal for a digital still camera, and a method for manufacturing the zoom lens.

TECHNICAL BACKGROUND

In recent years, image capturing apparatuses (cameras) using solid-state image sensors, such as a digital still camera and a digital video camera, have rapidly progressed in terms of performance and compactness. For these image capturing apparatuses, a zoom lens is normally used for the image capturing lens. If a zoom lens is used, the user can easily take a picture at an angle of view which is optimum for the image capturing conditions. For the zoom lens, a wider angle of view, a larger aperture ratio and a higher zoom ratio are strongly demanded in order to expand the image capturing area of the camera. For this, a zoom lens which has a wide angle of view and sufficient brightness in the wide-angle end state, and which can perform telephotography, has been proposed (e.g. see Japanese Patent Application Laid-Open No. 2010-243637(A)).

This conventional zoom lens, however, does not satisfy the ideal optical performance.

With the foregoing in view, it is an object of the present invention to provide a zoom lens and an optical apparatus having an ideal optical performance with a wide-angle of view, a large aperture ratio and a high zoom ratio, and a method for manufacturing the zoom lens.

SUMMARY OF THE INVENTION

In order to achieve this object, a zoom lens according to the present invention is a zoom lens comprising, in order from an object: a first lens group having negative refractive power; a second lens group having positive refractive power; and a third lens group having positive refractive power, wherein upon zooming from a wide-angle end state to a telephoto end state, at least the first lens group and the second lens group move along an optical axis so that a distance between the first lens group and the second lens group decreases, and a distance between the second lens group and the third lens group increases, the lens closest to the object in the second lens group is a positive lens, the object side lens surface of the positive lens is an aspherical surface of which radius of curvature increases in a direction from the optical axis to the periphery of the lens, and the following conditional expression is satisfied:

$$0.018 < X \times Y\max/(fw \times TLw) < 0.040$$

where X denotes a sag within an effective diameter on the object side lens surface of the positive lens, Ymax denotes a maximum image height of the zoom lens in the wide-angle end state, fw denotes a focal length of the zoom lens in the wide-angle end state, and TLw denotes a total length of the zoom lens in the wide-angle end state.

In this zoom lens, it is preferable that the following conditional expression is satisfied:

$$0.70 < f2F/f2 < 1.20$$

where f2F denotes a focal length of the positive lens closest to the object in the second lens group, and f2 denotes a focal length of the second lens group.

In this zoom lens, it is preferable that the following conditional expressions are satisfied:

$$2.60 < Nd + (0.02 \times vd) < 3.00; \text{ and}$$

$$1.65 < Nd < 1.85$$

where Nd denotes a refractive index of the positive lens closest to the object in the second lens group, and vd denotes an Abbe number of the positive lens closest to the object in the second lens group.

In this zoom lens, it is preferable that the following conditional expression is satisfied:

$$1.30 < ft/(-f1) < 2.10$$

where ft denotes a focal length of the zoom lens in the telephoto end state, and f1 denotes a focal length of the first lens group.

In this zoom lens, it is preferable that the first lens group comprises, in order from the object, one negative lens and one positive lens.

In this zoom lens, it is preferable that the lens closest to the object in the first lens group has an aspherical surface.

In this zoom lens, it is preferable that the second lens group comprises, in order from the object, a first positive lens which is the positive lens closest to the object in the second lens group, a second positive lens, and a negative lens.

In this zoom lens, it is preferable that the second lens group comprises, in order from an image, a positive lens and a negative lens.

In this zoom lens, it is preferable that at least a part of the lenses in the second lens group is movable so as to have components in a direction orthogonal to the optical axis.

In this zoom lens, it is preferable that the third lens group is fixed on the optical axis upon zooming from the wide-angle end state to the telephoto end state.

An optical apparatus according to the present invention is an optical apparatus comprising a zoom lens for forming an image of an object on a predetermined surface, wherein the zoom lens is the zoom lens according to the present invention.

A method for manufacturing a zoom lens according to the present invention is a method for manufacturing a zoom lens by disposing, in order from an object, a first lens group having negative refractive power, a second lens group having positive refractive power, and a third lens group having positive refractive power, wherein upon zooming from a wide-angle end state to a telephoto end state, at least the first lens group and the second lens group move along an optical axis so that a distance between the first lens group and the second lens group decreases, and a distance between the second lens group and the third lens group increases, the lens closest to the object in the second lens group is a positive lens, the object side lens surface of the positive lens is an aspherical surface of which radius of curvature increases in a direction from the optical axis to the periphery of the lens, and the following conditional expression is satisfied:

$$0.018 < X \times Y\max/(fw \times TLw) < 0.040$$

where X denotes a sag within an effective diameter on the object side lens surface of the positive lens, Ymax denotes a maximum image height of the zoom lens in the wide-angle end state, fw denotes a focal length of the zoom lens in the wide-angle end state, and TLw denotes a total length of the zoom lens in the wide-angle end state.

In this manufacturing method, it is preferable that the following conditional expression is satisfied:

$$0.70 < f2F/f2 < 1.20$$

where f2F denotes a focal length of the positive lens closest to the object in the second lens group, and f2 denotes a focal length of the second lens group.

In this manufacturing method, it is preferable that the following conditional expressions are satisfied:

$$2.60 < Nd + (0.02 \times vd) < 3.00; \text{ and}$$

$$1.65 < Nd < 1.85$$

where Nd denotes a refractive index of the positive lens closest to the object in the second lens group, and vd denotes an Abbe number of the positive lens closest to the object in the second lens group.

In this manufacturing method, it is preferable that the following conditional expression is satisfied:

$$1.30 < ft/(-f1) < 2.10$$

where ft denotes a focal length of the zoom lens in the telephoto end state, and f1 denotes a focal length of the first lens group.

According to the present invention, an ideal optical performance can be implemented with a wide-angle of view, a large aperture ratio and a high zoom ratio.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 1A shows a lens configuration of a zoom lens according to Example 1 in a wide-angle end state, FIG. 1B shows the lens configuration in an intermediate focal length state, and FIG. 1C shows the lens configuration in a telephoto end state;

FIG. 8 is a flow chart depicting a method for manufacturing the zoom lens.

DESCRIPTION OF THE EMBODIMENT

Figure 7A:
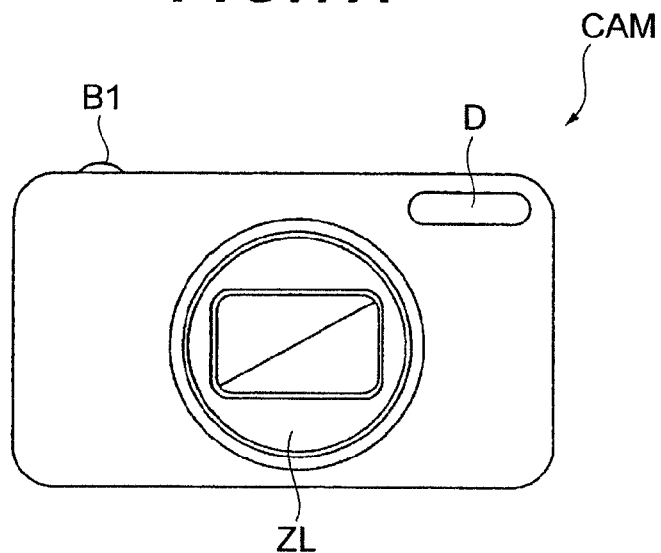
FIG. 7A is a front view of a digital still camera.
Figure 7B:
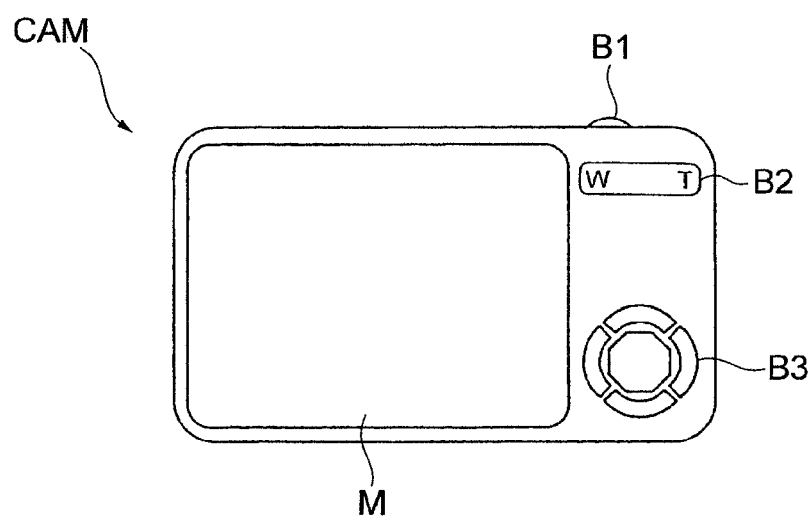
FIG. 7B is a rear view of the digital still camera.

Embodiments of the present invention will now be described with reference to the drawings. FIG. 7 shows a digital still camera CAM with a zoom lens according to the present invention. FIG. 7A shows a front view of the digital still camera CAM, and FIG. 7B shows a rear view of the digital still camera CAM.

If a power button (not illustrated) is pressed on the digital still camera CAM shown in FIG. 7, a shutter (not illustrated) of an image capturing lens (ZL) is released, and lights from an object are collected by the image capturing lens (ZL) and form an image on a picture element (not illustrated) (e.g. CCD and CMOS), which is disposed on the image plane I (e.g. see FIG. 1). The object image formed on the picture element is displayed on a liquid crystal monitor M disposed on the back of the digital still camera CAM. The user determines the composition of the object image while viewing the liquid crystal monitor M, then presses a release button B1 to capture the object image by the picture element, and stores it in memory (not illustrated).

The image capturing lens is constituted by a later mentioned zoom lens ZL according to the embodiment. The digital still camera CAM has an auxiliary light emitting unit D, which emits auxiliary light when the object is dark, a wide (W)-tele (T) button B2 for zooming the image capturing lens (zoom lens ZL) from a wide-angle end state (W) to a telephoto end state (T), and a function button B3, which is used for setting various conditions for the digital still camera CAM.

The zoom lens ZL is, for example, a negative-lead type zoom lens comprising, in order from an object, a first lens group G1 having negative refractive power as a whole, a second lens group G2 having positive refractive power as a whole, and a third lens group G3 having positive refractive power as a whole, as shown in FIG. 1. The second lens group G2 is a zoom unit and a master lens group, the first lens group G1 is a compensator group. The third lens group G3 optimizes an exit pupil position of the zoom lens system with respect to a picture element, and corrects residual aberrations which could not be corrected by the first lens group G1 and the second lens group G2. Upon zooming from a wide-angle end state to a telephoto end state, at least the first lens group G1 and the second lens group G2 move along the optical axis, so that the distance between the first lens group G1 and the second lens group G2 decreases, and the distance between the second lens group G2 and the third lens group G3 increases.

In order to implement a wider angle of view, a larger aperture ratio and a higher zoom ratio of the lens at the same time using the zoom lens ZL having such a simple structure, various conditions must be satisfied. In particular, the configuration of each lens group, refractive power of each lens and shape and position of aspherical lenses, among other conditions, must be set appropriately, otherwise good aberration correction becomes difficult. On the other hand, in terms of practicality of the zoom lens, the size of the entire zoom lens must be sufficiently small.

In order to implement an ideal optical performance while increasing the aperture ratio of the zoom lens, it is preferable that the lens closest to the object in the second lens group G2 is a positive lens, and the object side lens surface of this positive lens is an aspherical surface of which radius of curvature increases in the direction from the optical axis to the periphery of the lens. Furthermore, it is preferable that the following conditional expression (1) is satisfied, where X denotes a sag of the positive lens within the effective diameter of the objective side lens surface, Ymax denotes a maximum image height of the zoom lens ZL in the wide-angle end state, fw denotes a focal length of the zoom lens ZL in the wide-angle end state, and TLw denotes a total length of the zoom lens ZL in the wide-angle end state.

$$0.018 < X \times Y\text{max}/(fw \times TLw) < 0.040 \quad (1)$$

The conditional expression (1) is a conditional expression for ideally correcting spherical aberration which increases as the aperture ratio of the optical system increases. According to this embodiment, the zoom lens comprises three lens groups, which are, in order from the object, a negative lens group, a positive lens group and a positive lens group. Because of this configuration, an angle of view exceeding 80° can be implemented in the wide-angle end state, and an optimum incident angle can be maintained for the solid-state image sensor, without increasing the size of the lens. However correction of spherical aberration tends to be difficult, since luminous flux which diverged in the first lens group enters the second lens group. Therefore a positive lens for converging the luminous flux which diverged in the first lens group G1 is disposed on the side closest to the object in the second lens group G2, and the object side lens surface of this positive lens is formed as an aspherical lens, of which radius of curvature increases in the direction towards the periphery of the lens, then the spherical aberration can be effectively corrected.

The conditional expression (1) specifies an appropriate range of the sag of this aspherical lens. If the lower limit value of the conditional expression (1) is not reached, it becomes difficult to correct spherical aberration and coma aberration if the aperture ratio of the zoom lens is increased, therefore this is not desirable. If the upper limit value of the conditional expression (1) is exceeded, it becomes difficult to correct spherical aberration in the wide-angle end state, which is not desirable.

To demonstrate the effect of this embodiment well, it is preferable that the lower limit value of the conditional expression (1) is 0.020. To demonstrate the effect of the embodiment even more so, it is preferable that the lower limit value of the conditional expression (1) is 0.021. To demonstrate the effect of this embodiment well, it is preferable that the upper limit value of the conditional expression (1) is 0.036. To demonstrate the effect of this embodiment even more so, it is preferable that the upper limit value of the conditional expression (1) is 0.032.

In the zoom lens ZL having this configuration, it is preferable that the following expression (2) is satisfied, where f2F denotes a focal length of the positive lens closest to the object in the second lens group G2, and f2 denotes a focal length of the second lens group G2.

$$0.70 < f2F/f2 < 1.20 \quad (2)$$

The conditional expression (2) is also a conditional expression for ideally correcting spherical aberration which increases as the aperture ratio of the optical system increases. In order to prevent generation of excessive spherical aberration in the second lens group G2, where luminous flux which diverged in the first lens group G1 having negative refractive power enters, it is necessary to provide an appropriate refractive power to the positive lens closest to the object in the second lens group G2 so as to converge the diverged luminous flux. If the lower limit value of the conditional expression (2) is not reached, the refractive power of the positive lens closest to the object in the second lens group G2 becomes too high, and spherical aberration generated in this positive lens increases. Further a performance drop during manufacturing, due to decentering, for example, tends to occur, which is not desirable. If the upper limit value of the conditional expression (2) is exceeded, on the other hand, the refractive power of the positive lens closest to the object in the second lens group G2 becomes too low, and the luminous flux which diverged in the first lens group G1 cannot be converged sufficiently. As a result, spherical aberration generated by the rear lens of the second lens group G2 increases, which is not desirable.

To demonstrate the effect of this embodiment well, it is preferable that the lower limit value of the conditional expression (2) is 0.75. To demonstrate the effect of the embodiment even more so, it is preferable that the lower limit value of the conditional expression (2) is 0.80. To demonstrate the effect of this embodiment well, it is preferable that the upper limit value of the conditional expression (2) is 1.10. To demonstrate the effect of this embodiment even more so, it is preferable that the upper limit value of the conditional expression (2) is 1.00.

In the zoom lens ZL having this configuration, it is preferable that the following conditional expression (3) is satisfied, where Nd denotes a refractive index of the positive lens closest to the object in the second lens group G2, and νd denotes an Abbe number of the positive lens closest to the object in the second lens group G2.

$$2.60 < Nd + (0.02 \times \nu d) < 3.00 \quad (3)$$

The conditional expression (3) is a conditional expression for ideally correcting longitudinal chromatic aberration. If the lower limit value of the conditional expression (3) is not reached, correction of the longitudinal chromatic aberration becomes insufficient, which is not desirable. If the upper limit value of the conditional expression (3) is exceeded, on the other hand, it becomes difficult to correct the difference of spherical aberration generated by the wavelength in the telephoto end state, which is not desirable.

To demonstrate the effect of this embodiment well, it is preferable that the lower limit value of the conditional expression (3) is 2.70. To demonstrate the effect of the embodiment even more so, it is preferable that the lower limit value of the conditional expression (3) is 2.75. To demonstrate the effect of this embodiment well, it is preferable that the upper limit value of the conditional expression (3) is 2.90. To demonstrate the effect of this embodiment even more so, it is preferable that the upper limit value of the conditional expression (3) is 2.85.

In the zoom lens ZL having this configuration, it is preferable that the following conditional expression (4) is satisfied, where Nd denotes a refractive index of the positive lens closest to the object in the second lens group G2.

$$1.65 < Nd < 1.85 \quad (4)$$

The conditional expression (4) specifies the refractive index of the positive lens closest to the object in the second lens group G2 to an appropriate range. If the lower limit value of the conditional expression (4) is not reached, it becomes difficult to correct spherical aberration and coma aberration, which is not desirable. If the upper limit value of the conditional expression (4) is exceeded, on the other hand, the partial dispersion ratio of glass deteriorates, and correction of the secondary spectrum becomes difficult, which is not desirable.

To demonstrate the effect of this embodiment well, it is preferable that the lower limit value of the conditional expression (4) is 1.68. To demonstrate the effect of the embodiment even more so, it is preferable that the lower limit value of the conditional expression (4) is 1.70. To demonstrate the effect of this embodiment well, it is preferable that the upper limit value of the conditional expression (4) is 1.80. To demonstrate the effect of this embodiment even more so, it is preferable that the upper limit value of the conditional expression (4) is 1.77.

In the zoom lens ZL having this configuration, it is preferable that the following conditional expression (5) is satisfied, where ft denotes a focal length of the zoom lens ZL in the telephoto end state, and f1 denotes a focal length of the first lens group G1.

$$1.30 < ft/(-f1) < 2.10 \quad (5)$$

The conditional expression (5) satisfies the ratio of the focal length of the first lens group G1 to the focal length of the entire system of the zoom lens ZL. If the lower limit value of the conditional expression (5) is not reached, it becomes difficult to correct coma aberration in the wide-angle end state, which is not desirable. If the upper limit value of the conditional expression (5) is exceeded, on the other hand, it becomes difficult to correct spherical aberration in the telephoto end state, which is not desirable.

To demonstrate the effect of this embodiment well, it is preferable that the lower limit value of the conditional expression (5) is 1.35. To demonstrate the effect of the embodiment even more so, it is preferable that the lower limit value of the conditional expression (5) is 1.40. To demonstrate the effect of this embodiment well, it is preferable that the upper limit value of the conditional expression (5) is 2.00. To demonstrate the effect of this embodiment even more so, it is preferable that the upper limit value of the conditional expression (5) is 1.85.

In the zoom lens ZL having this configuration, it is preferable that the first lens group G1 includes, in order from the object, one negative lens and one positive lens. This configuration is a lens configuration constituted by a minimum number of lenses with which chromatic aberration, spherical aberration, coma aberration and astigmatism of the first lens group G1 can be corrected, and is the best configuration to implement both compactness and high performance of the lens.

In the zoom lens ZL having this configuration, it is preferable that the lens closest to the object in the first lens group G1 has an aspherical surface. If the lens closest to the object in the first lens group G1 is an aspherical lens, coma aberration and astigmatism in the wide-angle end state, and coma aberration in the telephoto end state can be corrected well.

In the zoom lens ZL having this configuration, it is preferable that the second lens group G2 includes, in order from the object, a first positive lens, which is a positive lens closest to the object in the second lens group G2, a second positive lens, and a negative lens. Because of this configuration, the principal points of the second lens group G2 can be moved toward the object. As a consequence, the distance between the first lens group G1 and the second lens group G2 can be secured in the telephoto end state, and spherical aberration can be corrected well.

In the zoom lens ZL having this configuration, it is preferable that the second lens group G2 includes, in order from the image, a positive lens and a negative lens. Because of this configuration, curvature of field in the wide-angle end state can be corrected well.

In the zoom lens ZL having this configuration, it is preferable that at least a part of the lenses in the second lens group G2 is movable in a direction orthogonal to the optical axis. Because of this configuration, the generation of decentration coma aberration can be decreased upon correcting motion blur.

In the zoom lens ZL having this configuration, it is preferable that the third lens group G3 is fixed on the optical axis upon zooming from the wide-angle end state to the telephoto end state. If the third lens group G3 is fixed, lateral chromatic aberration in the telephoto end state can be corrected well.

Thus according to this embodiment, a zoom lens ZL having an ideal optical performance with a wide-angle of view, a large aperture ratio and a high zoom ratio, and an optical apparatus (digital still camera CAM) having this zoom lens ZL, can be implemented.

Focusing from an object at infinity to an object at a close distance (object at a finite distance) can be performed by moving the first lens group G1 or the third lens group G3 to the object side. However moving the first lens group G1 tends to drop the quantity of light in the edges of the screen when an object at a close distance is photographed, therefore it is preferable to move the third lens group G3 to the object side.

A method for manufacturing the zoom lens ZL having this configuration will now be described with reference to FIG. 8. First the first lens group G1 having negative refractive power, the second lens group G2 having positive refractive power and the third lens group G3 having positive refractive power are assembled in order from the object, in a cylindrical lens barrel (step ST10). At least the first lens group G1 and the second lens group G2 are drivably configured so that the distance between the first lens group G1 and the second lens group G2 decreases, and the distance between the second lens group G2 and the third lens group G3 increases upon zooming from the wide-angle end state to the telephoto end state (step ST20).

In step ST10 for assembling the lenses, the first to the third lens groups G1 to G3 are disposed so that the lens closest to the object in the second lens group G2 is a positive lens, the object side lens surface of this positive lens is an aspherical lens surface of which radius of curvature increases in the direction from the optical axis to the periphery of the lens, and the above mentioned conditional expression (1) is satisfied. According to this manufacturing method, a zoom lens ZL having an ideal optical performance with a wide-angle of view, a large aperture ratio and a high zoom ratio can be implemented. It is preferable to satisfy the above mentioned conditions (e.g. conditional expression (2) to conditional expression (5)) as well.

EXAMPLES

Example 1

Each example of the present invention will now be described with reference to the drawings. Example 1 will be described with reference to FIG. 1, FIG. 2 and Table 1. FIG. 1A shows a lens configuration of the zoom lens according to Example 1 in the wide-angle end state, FIG. 1B shows the lens configuration in the intermediate focal length state, and FIG. 1C shows the lens configuration in the telephoto end state. The zoom lens ZL according to Example 1 comprises, in order from an object, a first lens group G1 having negative refractive power as a whole, a second lens group G2 having positive refractive power as a whole, and a third lens group G3 having positive refractive power as a whole. Upon zooming from the wide-angle end state to the telephoto end state, the first lens group G1 and the second lens group G2 move along the optical axis respectively, and the third lens group G3 is fixed on the optical axis, so that the distance between the first lens group G1 and the second lens group G2 decreases, and the distance between the second lens group G2 and the third lens group G3 increases.

The first lens group G1 includes, in order from an object, a biconcave negative lens L11, and a positive meniscus lens L12 having a convex surface facing the object, and the lens surface facing the image plane I in the negative lens L11 is aspherical. The second lens group G2 includes, in order from the object, a first positive lens L21 which is a positive meniscus lens having a convex surface facing the object, a second positive lens L22 which is a biconvex positive lens, a biconcave negative lens L23 and a third positive lens L24 which is a biconvex positive lens, and both lens surfaces of the first positive lens L21 are aspherical. The second positive lens L22 and the negative lens L23 are cemented to be a cemented lens. The third lens group G3 is constituted by only a biconvex positive lens L31. Focusing from an object at infinity to an object at a close distance (object at a finite distance) is performed by moving the third lens group G3 to the object side along the optical axis.

An iris diaphragm S for determining the F number is disposed between the first lens group G1 and the second lens group G2, and moves on the same path as the second lens group G2 upon zooming from the wide-angle end state to the telephoto end state. A filter group FL disposed between the third lens group G3 and the image plane I is constituted by a low pass filter, an infrared cut-off filter or the like.

Table 1 to Table 3 shown below list each data on the zoom lenses according to Example 1 to Example 3. In [General Data] in each table, values of the focal length f of the zoom lens ZL, F number Fno, angle of view $2\omega$, aperture stop diameter $\phi$, and maximum image height Ymax are shown respectively, for each state of the wide-angle end state, intermediate focal length state and telephoto end state. In [Lens Data], the first column (surface number) is the number of the lens surface counted from the object side, the second column r is the radius of curvature of the lens surface, the third column d is a distance to the next lens surface on the optical axis, the fourth column n is a refractive index at d-line (wavelength $\lambda$=587.6 nm), and the fifth column $\nu$ is an Abbe number at d-line (wavelength $\lambda$=587.6 nm). "*" attached to the right of the first column (surface number) indicates that this lens surface is aspherical. The radius of curvature "∞" indicates a plane, and the refractive index of air n=1.000000 is omitted. BF is back focus.

In [Aspherical Data], an aspherical coefficient is given by the following expression (6), where y denotes a height in a direction orthogonal to the optical axis, X(y) denotes a distance (sag) along the optical axis, from the tangential plane at the vertex of each aspherical surface to each aspherical surface at height y, R denotes a paraxial radius of curvature (radius of curvature of the reference spherical surface), $\kappa$ denotes a conical coefficient, and An is an aspherical coefficient in degree n (n=4, 6, 8, 10). In each example, the aspherical coefficient in degree 2, that is A2 is 0, which is omitted in the tables. In [Aspherical Data], "E-n" indicates "$\times 10^{-n}$".

$$X(y)=(y^2/R)/\{1+(1-\kappa \times y^2/R^2)^{1/2}\}+A4\times y^4+A6\times y^6+A8\times y^8+A10\times y^{10} \quad (16)$$

In [Variable Distance Data], each value of the focal length f of the zoom lens ZL, variable distances D1 to D3, back focus BF (converted into air) and total length TL (converted into air) is shown for each state of the wide-angle end state, intermediate focal length state and telephoto end state (focusing on infinity) respectively. In [Lens Group Focal Length], a value of focal length of each lens group is shown respectively. In [Aspherical sag], a value of a sag X within the effective diameter of the object side lens surface of the positive lens closest to the object in the second lens group G2 is shown. In [Conditional Expression Correspondence Value], a correspondence value of each conditional expression is shown. In all the data values, "mm" is normally used as the unit of focal length f, radius of curvature r, surface distance d and other lengths, but unit is not limited to "mm", since an equivalent optical performance is obtained even if an optical system is proportionally expanded or proportionally reduced. For the data values of the later mentioned Example 2 and Example 3 as well, symbols the same as this example are used.

Table 1 shows each data of Example 1. The surface numbers 1 to 18 in Table 1 correspond to surfaces 1 to 18 in FIG. 1, and the group numbers G1 to G3 in Table 1 correspond to the lens groups G1 to G3 in FIG. 1 respectively. In Example 1, the lens surfaces of Surface 2, Surface 6 and Surface 7 are formed to be aspherical respectively.

TABLE 1

[General Data]
Zoom ratio = 3.92

| | Wide-angle end state | Intermediate focal length state | Telephoto end state |
|---|---|---|---|
| f | 4.43 | 8.80 | 17.38 |
| Fno | 1.84 | 3.46 | 5.33 |
| 2ω | 85.36° | 49.26° | 25.38° |
| φ | 8.80 | 6.22 | 6.22 |
| Ymax | 3.50 | 3.90 | 3.90 |

[Lens Data]

| Surface number | r | d | n | ν |
|---|---|---|---|---|
| 1 | −300.3441 | 1.0500 | 1.79050 | 44.98 |
| 2* | 5.0794 | 2.8000 | | |
| 3 | 11.0779 | 1.7000 | 1.92286 | 20.88 |
| 4 | 23.8854 | (D1) | | |
| 5 | ∞ | 0.4000 | | (Aperture stop) |
| 6* | 7.0870 | 2.1500 | 1.72903 | 54.04 |
| 7* | 214.4751 | 0.1000 | | |
| 8 | 8.0391 | 2.2000 | 1.80400 | 46.58 |
| 9 | −33.8524 | 0.5500 | 2.00100 | 29.14 |
| 10 | 4.6586 | 0.7600 | | |
| 11 | 16.3728 | 1.7500 | 1.60300 | 65.47 |
| 12 | −18.8771 | (D2) | | |
| 13 | 19.3251 | 1.5500 | 1.61800 | 63.38 |
| 14 | −44.4565 | (D3) | | |
| 15 | ∞ | 0.2100 | 1.51680 | 64.12 |
| 16 | ∞ | 0.2900 | | |
| 17 | ∞ | 0.5000 | 1.51680 | 64.12 |
| 18 | ∞ | (BF) | | |

[Aspherical Data]

Surface 2

$\kappa$ = 0.4523, A4 = −2.16581E−04, A6 = −4.09263E−06,
A8 = 7.89283E−09, A10 = −2.25386E−09

Surface 6

$\kappa$ = 1.0000, A4 = −1.65945E−04, A6 = −3.47161E−06,
A8 = 0.00000E+00, A10 = 0.00000E+00

TABLE 1-continued

Surface 7

κ = 1.0000, A4 = 7.21810E−05, A6 = 0.00000E+00,
A8 = 0.00000E+00, A10 = 0.00000E+00

[Variable Distance Data]

|    | Wide-angle end state | Intermediate focal length state | Telephoto end state |
|----|----------------------|--------------------------------|---------------------|
| f  | 4.43                 | 8.80                           | 17.38               |
| D1 | 17.2842              | 7.0376                         | 1.9096              |
| D2 | 4.8625               | 10.5948                        | 21.8493             |
| D3 | 2.5373               | 2.5373                         | 2.5373              |
| BF | 0.5300               | 0.5300                         | 0.5300              |
| TL | 41.2340              | 36.7196                        | 42.8463             |

[Lens Group Focal Length]

| Group number | First surface of group | Group focal length |
|--------------|-----------------------|--------------------|
| G1           | 1                     | −10.50             |
| G2           | 6                     | 10.95              |
| G3           | 13                    | 22.00              |

[Aspherical sag]

X = 1.18

[Conditional Expression Correspondence Value]

Conditional expression (1) X × Ymax/(fw × TLw) = 0.0226
Conditional expression (2) f2F/f2 = 0.9141
Conditional expression (3) Nd + (0.02 × νd) = 2.8098
Conditional expression (4) Nd = 1.7290
Conditional expression (5) ft/(−f1) = 1.6552

As a result, this example satisfies all conditional expressions (1) to (5).

Figure 2B:
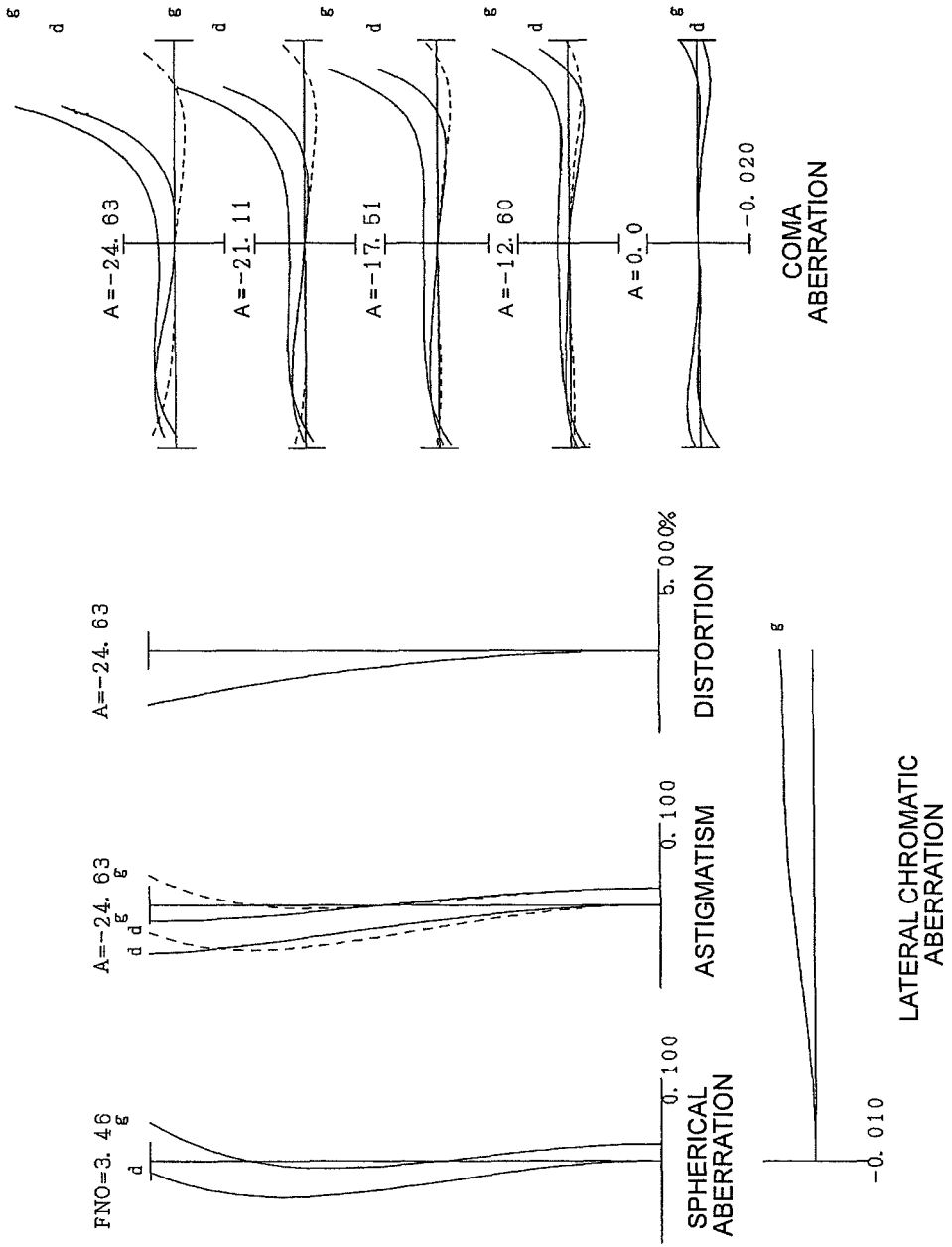
FIG. 2A are graphs showing various aberrations of the zoom lens according to Example 1 upon focusing on infinity in the wide-angle end state, FIG. 2B are graphs showing various aberrations of the zoom lens upon focusing on infinity in the intermediate focal length state, and FIG. 2C are graphs showing various aberrations of the zoom lens upon focusing on infinity in the telephoto end state.
Figure 2C:
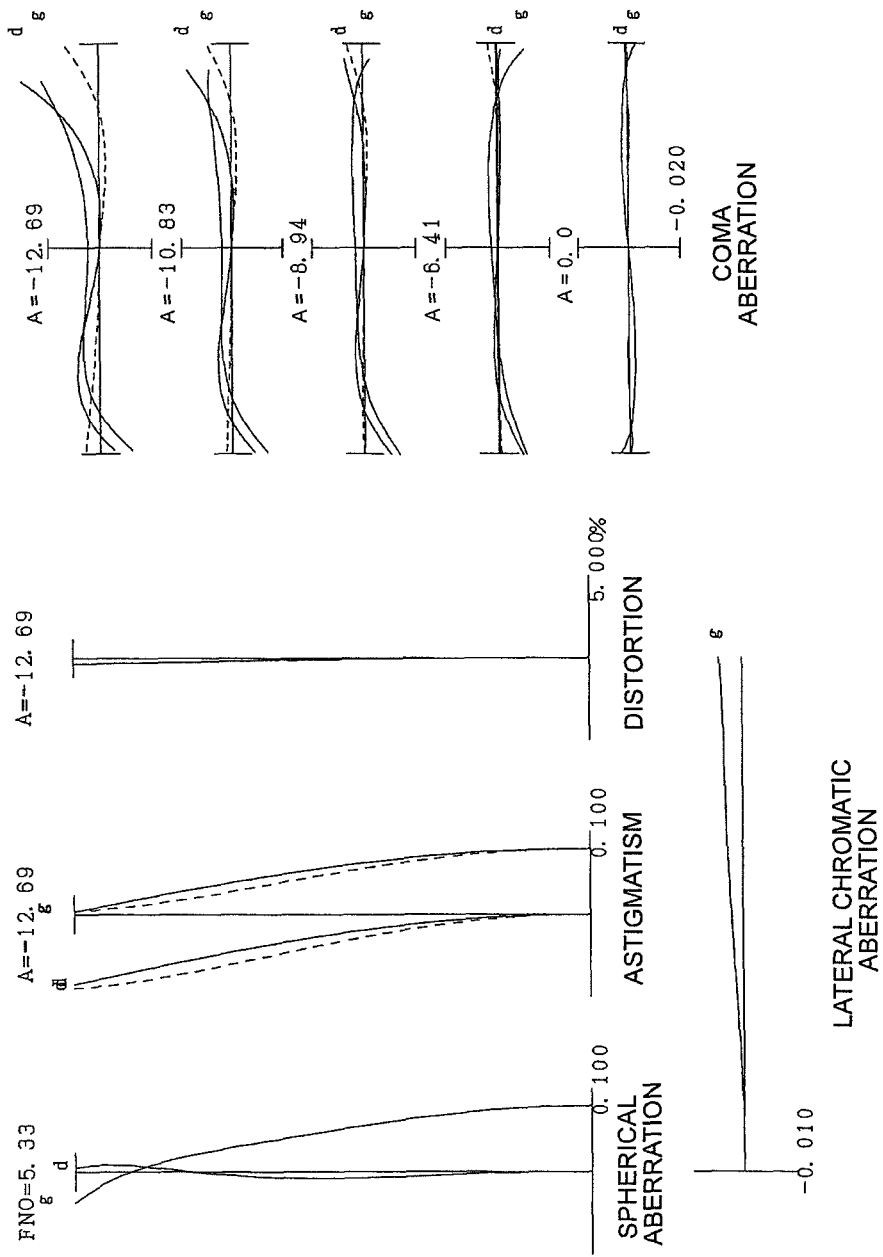

FIG. 2A to FIG. 2C are graphs showing various aberrations of the zoom lens ZL according to Example 1. FIG. 2A are graphs showing various aberrations of the zoom lens upon focusing on infinity in the wide-angle end state (f=4.43 mm), FIG. 2B are graphs showing various aberrations of the zoom lens upon focusing on infinity in the intermediate focal length state (f=8.80 mm), and FIG. 2C are graphs showing various aberrations of the zoom lens upon focusing on infinity in the telephoto end state (f=17.38 mm). In each graph showing aberrations, FNO is an F number, and A is a half angle of view. In each graph showing aberrations, d indicates various aberrations at d-line (λ=587.6 nm), and g indicates various Aberrations at g-line (λ=435.8 nm). In graphs showing astigmatism, the solid line indicates the sagittal image surface, and the broken line indicates the meridional image surface. The description on the graphs showing aberrations is the same as for other examples.

As each graph showing aberrations clarifies, the zoom lens according to Example 1 has an excellent optical performance, where various aberrations are ideally corrected in each focal length state from the wide-angle end state to the telephoto end state. As a result, an excellent optical performance can be guaranteed for the digital still camera CAM as well, by installing the zoom lens ZL of Example 1.

Example 2

Figures 3A, 3B, 3C:
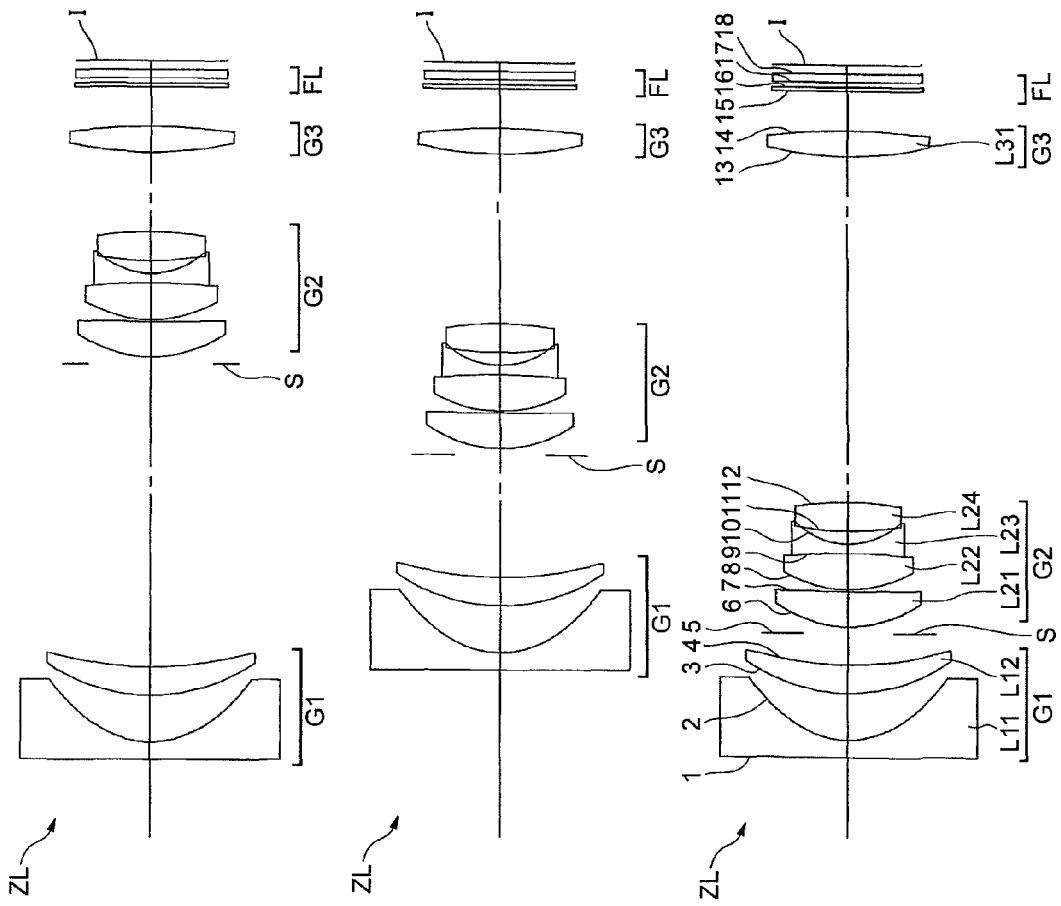
FIG. 3A shows a lens configuration of a zoom lens according to Example 2 in a wide-angle end state.
FIG. 3B shows the lens configuration in an intermediate focal length state.
FIG. 3C shows the lens configuration in a telephoto end state.

Example 2 will be described with reference to FIG. 3, FIG. 4 and Table 2. FIG. 3A shows a lens configuration of the zoom lens according to Example 2 in the wide-angle end state, FIG. 3B shows the lens configuration in the intermediate focal length state, and FIG. 3C shows the lens configuration in the telephoto end state. The zoom lens of Example 2 has a same configuration as the zoom lens of Example 1, except for a part of the shape of the first lens group G1, therefore each component the same as Example 1 is denoted with the same reference symbol, for which detailed description is omitted. The first lens group G1 in Example 2 includes, in order from an object, a negative meniscus lens L11 having a convex surface facing the object positive and a positive meniscus lens L12 having a convex surface facing the object, and the lens surface facing the image plane I in the negative meniscus lens L11 is aspherical.

Table 2 shows each data of Example 2. The surface numbers 1 to 18 in Table 2 correspond to surfaces 1 to 18 in FIG. 3, and the group numbers G1 to G3 in Table 2 correspond to the lens groups G1 to G3 in FIG. 3 respectively. In Example 2, the lens surfaces of Surface 2, Surface 6 and Surface 7 are formed to be aspherical respectively.

TABLE 2

[General Data]
Zoom ratio = 3.92

|      | Wide-angle end state | Intermediate focal length state | Telephoto end state |
|------|----------------------|--------------------------------|---------------------|
| f    | 4.43                 | 8.80                           | 17.38               |
| Fno  | 1.86                 | 3.40                           | 5.19                |
| 2ω   | 85.40°               | 49.23°                         | 25.40°              |
| φ    | 7.46                 | 5.52                           | 5.52                |
| Ymax | 3.50                 | 3.90                           | 3.90                |

[Lens Data]

| Surface number | r | d | n | ν |
|---|---|---|---|---|
| 1 | 825.2864 | 1.0500 | 1.79050 | 44.98 |
| 2* | 5.2606 | 2.8300 | | |
| 3 | 10.7087 | 1.7000 | 1.92286 | 20.88 |
| 4 | 20.8277 | (D1) | | |
| 5 | ∞ | 0.4000 | | (Aperture stop) |
| 6* | 7.2560 | 2.1500 | 1.72903 | 54.04 |
| 7* | 797.0205 | 0.1000 | | |
| 8 | 7.8478 | 2.2000 | 1.80400 | 46.58 |
| 9 | −34.9091 | 0.5500 | 2.00100 | 29.14 |
| 10 | 4.6586 | 0.7600 | | |
| 11 | 18.6500 | 1.7500 | 1.60300 | 65.47 |
| 12 | −18.6008 | (D2) | | |
| 13 | 21.5853 | 1.5500 | 1.61800 | 63.38 |
| 14 | −35.7258 | (D3) | | |
| 15 | ∞ | 0.2100 | 1.51680 | 64.12 |
| 16 | ∞ | 0.2900 | | |
| 17 | ∞ | 0.5000 | 1.51680 | 64.12 |
| 18 | ∞ | (BF) | | |

[Aspherical Data]

Surface 2

κ = 0.3432, A4 = −3.63810E−05, A6 = −6.18500E−07,
A8 = −2.03500E−08, A10 = −4.37740E−10

Surface 6

κ = 1.0000, A4 = −1.48650E−04, A6 = −2.87710E−06,
A8 = 0.00000E+00, A10 = 0.00000E+00

Surface 7

κ = 1.0000, A4 = 8.83300E−05, A6 = 0.00000E+00,
A8 = 0.00000E+00, A10 = 0.00000E+00

[Variable Distance Data]

|    | Wide-angle end state | Intermediate focal length state | Telephoto end state |
|----|----------------------|--------------------------------|---------------------|
| f  | 4.43                 | 8.80                           | 17.38               |
| D1 | 18.2482              | 7.3592                         | 1.9098              |
| D2 | 4.7702               | 10.1643                        | 20.7550             |
| D3 | 2.3885               | 2.3885                         | 2.3885              |

TABLE 2-continued

| | | | |
|---|---|---|---|
| BF | 0.5300 | 0.5300 | 0.5300 |
| TL | 41.9869 | 36.4920 | 41.6333 |

[Lens Group Focal Length]

| Group number | First surface of group | Group focal length |
|---|---|---|
| G1 | 1 | −11.02 |
| G2 | 6 | 10.95 |
| G3 | 13 | 22.00 |

[Aspherical sag]

X = 1.15

[Conditional Expression Correspondence Value]

Conditional expression (1) X × Ymax/(fw × TLw) = 0.0216
Conditional expression (2) f2F/f2 = 0.9166
Conditional expression (3) Nd + (0.02 × vd) = 2.8098
Conditional expression (4) Nd = 1.7290
Conditional expression (5) ft/(−f1) = 1.5767

As a result, this example satisfies all conditional expressions (1) to (5).

Figure 4A:
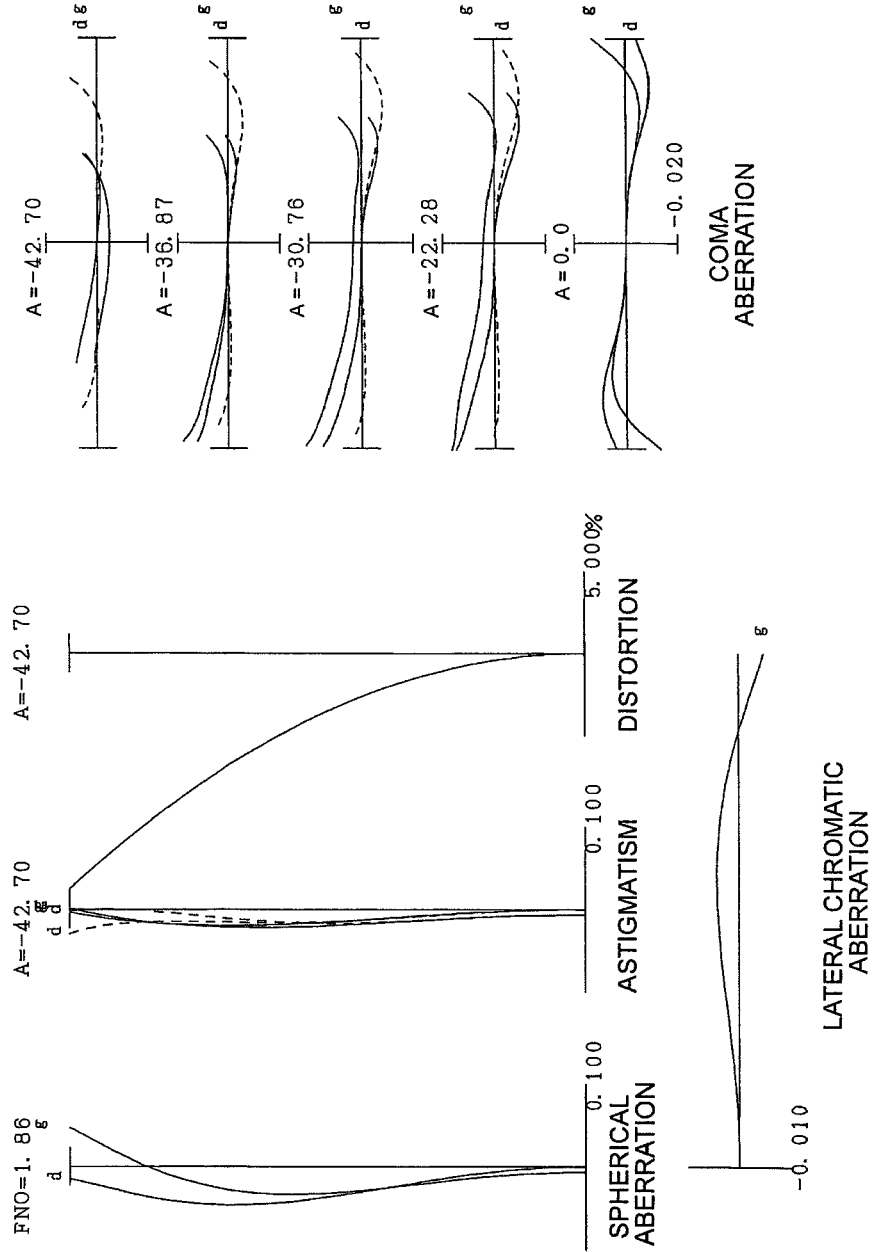
FIG. 4A are graphs showing various aberrations of the zoom lens according to Example 2 upon focusing on infinity in the wide-angle end state, FIG. 4B are graphs showing various aberrations of the zoom lens upon focusing on infinity in the intermediate focal length state, and FIG. 4C are graphs showing various aberrations of the zoom lens upon focusing on infinity in the telephoto end state.
Figure 4B:
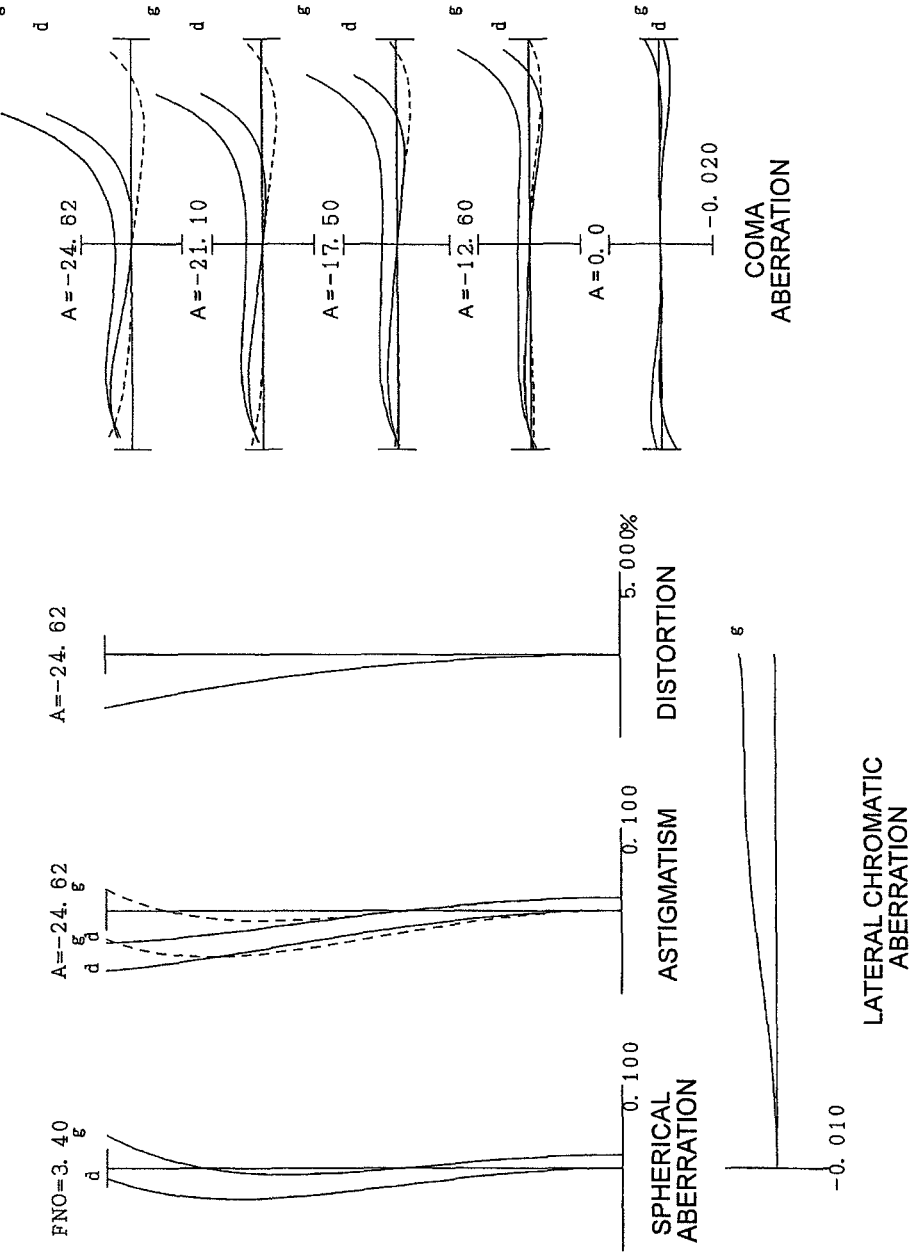

FIG. 4A to FIG. 4C are graphs showing various aberrations of the zoom lens ZL according to Example 2. FIG. 4A are graphs showing various aberrations of the zoom lens upon focusing on infinity in the wide-angle end state (f=4.43 mm), FIG. 4B are graphs showing various aberrations of the zoom lens upon focusing on infinity in the intermediate focal length state (f=8.80 mm), and FIG. 4C are graphs showing various aberrations of the zoom lens upon focusing on infinity in the telephoto end state (f=17.38 mm). As each graph showing aberrations clarifies, the zoom lens according to Example 2 has an excellent optical performance, where various aberrations are ideally corrected in each focal length state from the wide-angle end state to the telephoto end state. As a result, an excellent optical performance can be guaranteed for the digital still camera CAM as well, by installing the zoom lens ZL of Example 2.

Example 3

Figures 5A, 5B, 5C:
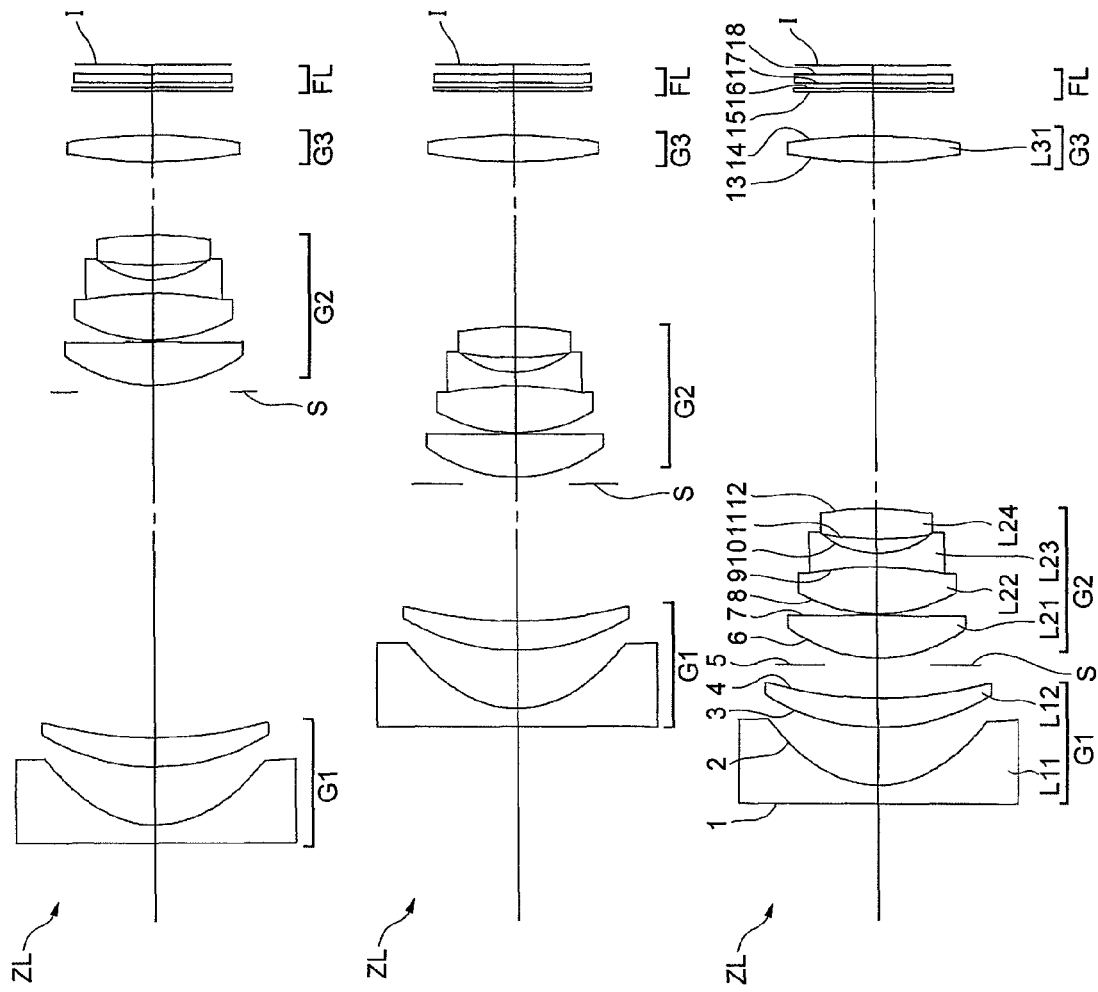
FIG. 5A shows a lens configuration of a zoom lens according to Example 3 in a wide-angle end state.
FIG. 5B shows the lens configuration in an intermediate focal length state.
FIG. 5C shows the lens configuration in a telephoto end state.

Example 3 will be described with reference to FIG. 5, FIG. 6 and Table 3. FIG. 5A shows a lens configuration of the zoom lens according to Example 3 in the wide-angle end state, FIG. 5B shows the lens configuration in the intermediate focal length state, and FIG. 5C shows the lens configuration in the telephoto end state. The zoom lens of Example 3 has a same configuration as the zoom lens of Example 1, except for a part of the shape of the second lens group G2, therefore each component the same as Example 1 is denoted with the same reference symbol, for which detailed description is omitted. The second lens group G2 in Example 2 includes, in order from an object, a first positive lens L21 having a biconvex positive lens, a second positive lens L22 having a biconvex positive lens, a biconcave negative lens L23, a third positive lens having a biconvex positive lens, and both surfaces of the first positive lens L21 are aspherical. Also, the second positive lens L22 and the negative lens L23 are cemented lenses cemented to each other.

Table 3 shows each data of Example 3. The surface numbers 1 to 18 in Table 3 correspond to surfaces 1 to 18 in FIG. 5, and the group numbers G1 to G3 in Table 3 correspond to the lens groups G1 to G3 in FIG. 5 respectively. In Example 3, the lens surfaces of Surface 2, Surface 6 and Surface 7 are formed to be aspherical respectively.

TABLE 3

[General Data]
Zoom ratio = 3.92

| | Wide-angle end state | Intermediate focal length state | Telephoto end state |
|---|---|---|---|
| f | 4.43 | 8.80 | 17.38 |
| Fno | 1.63 | 3.11 | 4.72 |
| 2ω | 85.41° | 49.19° | 25.46° |
| φ | 8.80 | 6.22 | 6.22 |
| Ymax | 3.50 | 3.90 | 3.90 |

[Lens Data]

| Surface number | r | d | n | v |
|---|---|---|---|---|
| 1 | −1644.8249 | 1.0500 | 1.79050 | 44.98 |
| 2* | 5.7173 | 3.3700 | | |
| 3 | 12.2365 | 1.7000 | 1.92286 | 20.88 |
| 4 | 24.0014 | (D1) | | |
| 5 | ∞ | 0.4000 | | (Aperture stop) |
| 6* | 8.0008 | 2.5000 | 1.72903 | 54.04 |
| 7* | −204.7614 | 0.1000 | | |
| 8 | 9.0605 | 2.7000 | 1.80400 | 46.58 |
| 9 | −21.3855 | 0.8000 | 2.00100 | 29.14 |
| 10 | 5.0294 | 0.8500 | | |
| 11 | 18.1102 | 1.7500 | 1.60300 | 65.47 |
| 12 | −19.1023 | (D2) | | |
| 13 | 25.6091 | 1.5500 | 1.61800 | 63.38 |
| 14 | −28.3134 | (D3) | | |
| 15 | ∞ | 0.2100 | 1.51680 | 64.12 |
| 16 | ∞ | 0.2900 | | |
| 17 | ∞ | 0.5000 | 1.51680 | 64.12 |
| 18 | ∞ | (BF) | | |

[Aspherical Data]

Surface 2

κ = 0.2870, A4 = −2.79530E−05, A6 = 1.61101E−06,
A8 = −7.55213E−08, A10 = 6.33322E−10

Surface 6

κ = 1.0000, A4 = −1.14385E−04, A6 = −1.39804E−06,
A8 = 0.00000E+00, A10 = 0.00000E+00

Surface 7

κ = 1.0000, A4 = 8.78698E−05, A6 = 0.00000E+00,
A8 = 0.00000E+00, A10 = 0.00000E+00

[Variable Distance Data]

| | Wide-angle end state | Intermediate focal length state | Telephoto end state |
|---|---|---|---|
| f | 4.43 | 8.80 | 17.38 |
| D1 | 20.0749 | 7.9724 | 1.9157 |
| D2 | 4.2392 | 9.5922 | 20.1022 |
| D3 | 2.5403 | 2.5403 | 2.5403 |
| BF | 0.5300 | 0.5300 | 0.5300 |
| TL | 45.1644 | 38.4149 | 42.8682 |

[Lens Group Focal Length]

| Group number | First surface of group | Group focal length |
|---|---|---|
| G1 | 1 | −11.70 |
| G2 | 6 | 11.50 |
| G3 | 13 | 22.00 |

[Aspherical sag]

X = 1.66

[Conditional Expression Correspondence Value]

Conditional expression (1) X × Ymax/(fw × TLw) = 0.0294
Conditional expression (2) f2F/f2 = 0.8805
Conditional expression (3) Nd + (0.02 × vd) = 2.8098

TABLE 3-continued

Conditional expression (4) Nd = 1.7290
Conditional expression (5) ft/(−f1) = 1.4855

As a result, this example satisfies all conditional expressions (1) to (5).

Figure 6A:
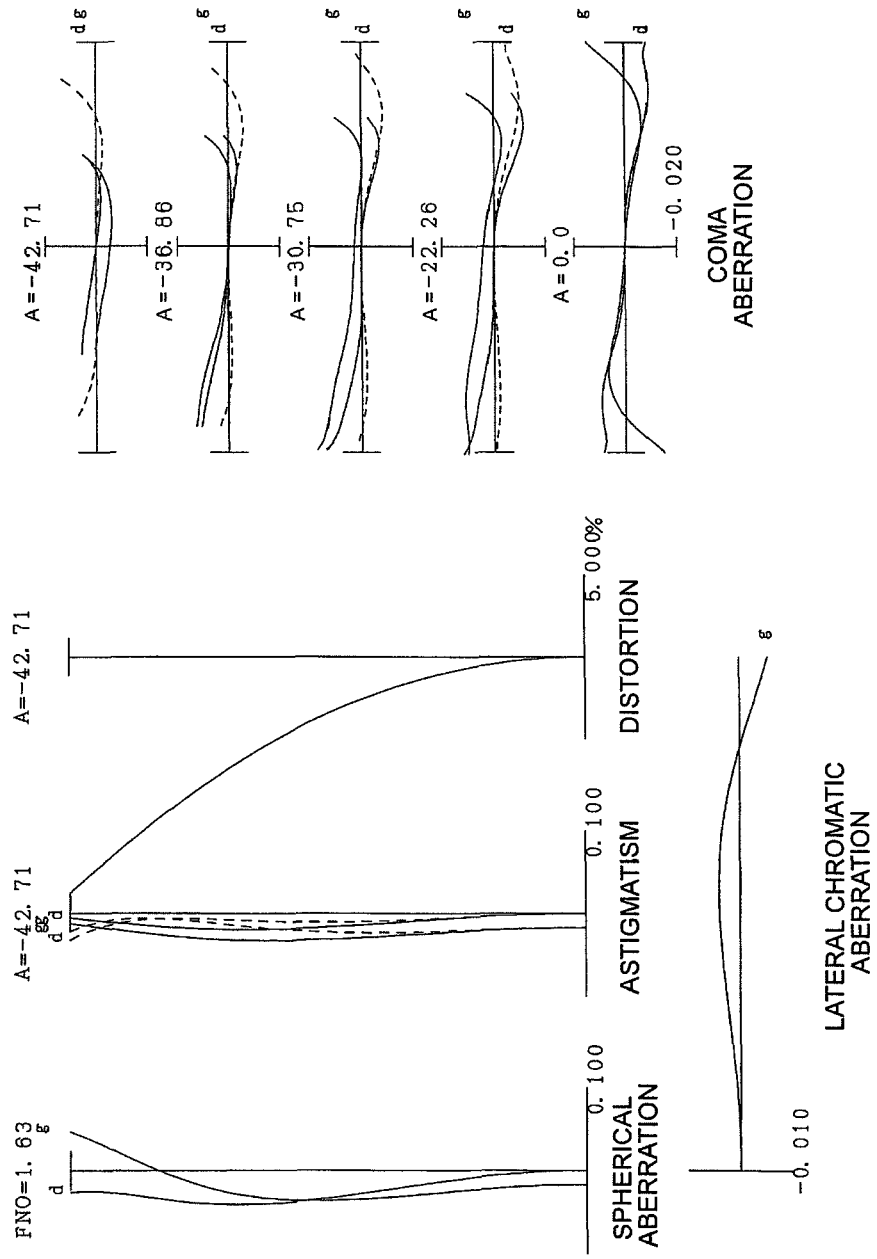
FIG. 6A are graphs showing various aberrations of the zoom lens according to Example 3 upon focusing on infinity in the wide-angle end state, FIG. 6B are graphs showing various aberrations of the zoom lens upon focusing on infinity in the intermediate focal length state, and FIG. 6C are graphs showing various aberrations of the zoom lens upon focusing on infinity in the telephoto end state.
Figure 6B:
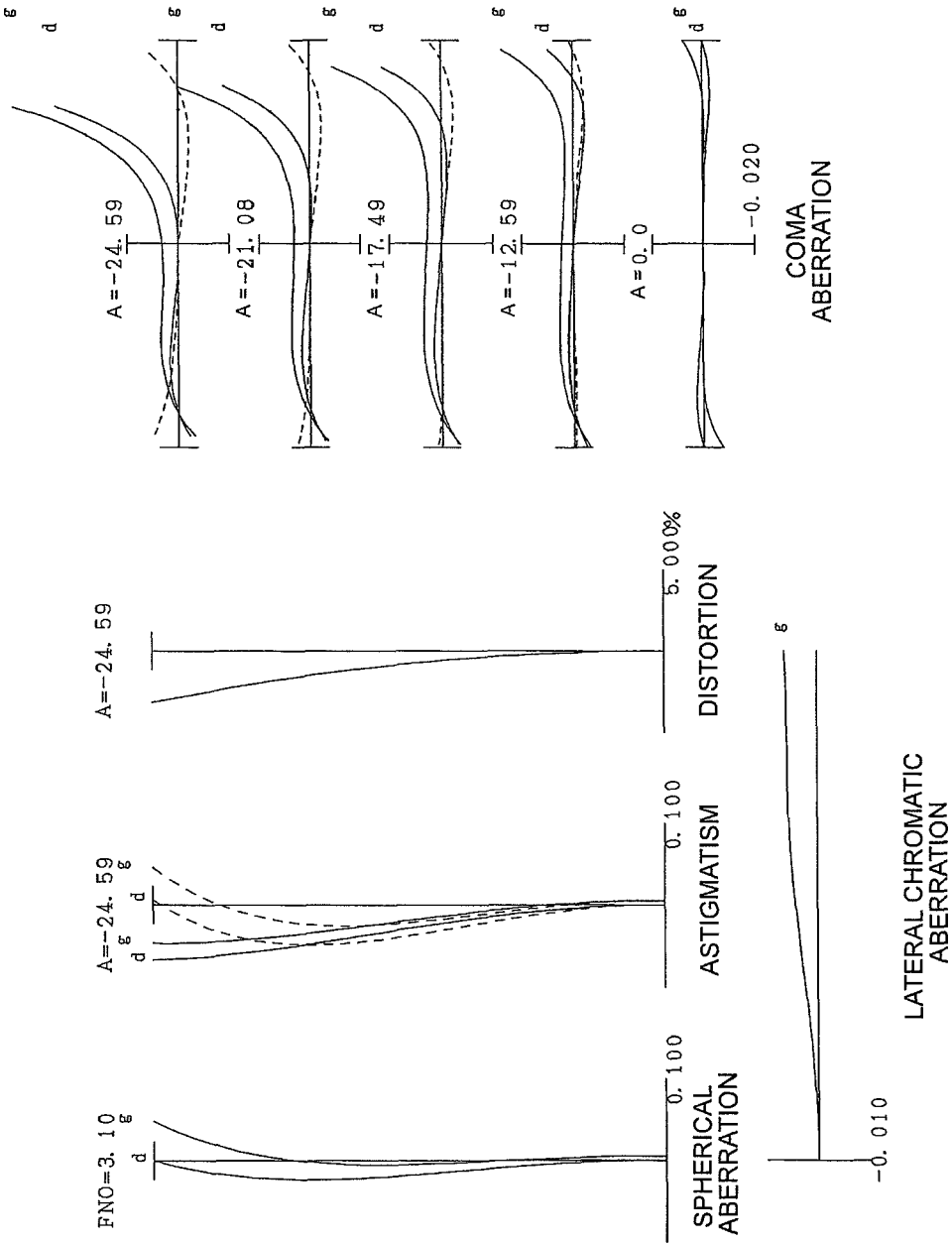
Figure 6C:
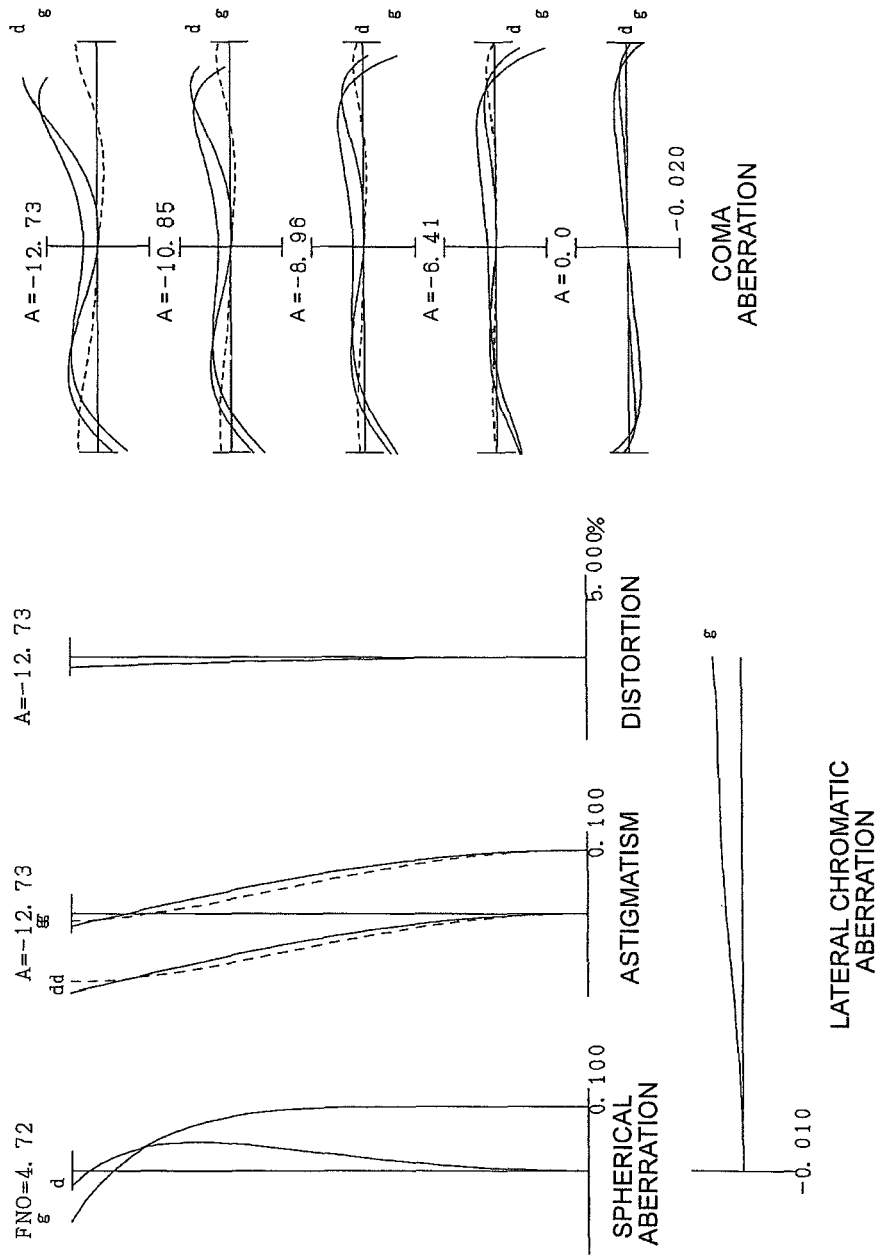

FIG. 6A to FIG. 6C are graphs showing various aberrations of the zoom lens ZL according to Example 3. FIG. 6A are graphs showing various aberrations of the zoom lens upon focusing on infinity in the wide-angle end state (f=4.43 mm), FIG. 6B are graphs showing various aberrations of the zoom lens upon focusing on infinity in the intermediate focal length state (f=8.80 mm), and FIG. 6C are graphs showing various aberrations of the zoom lens upon focusing on infinity in the telephoto end state (f=17.38 mm). As each graph showing aberrations clarifies, the zoom lens according to Example 3 has an excellent optical performance, where various aberrations are ideally corrected in each focal length state from the wide-angle end state to the telephoto end state. As a result, an excellent optical performance can be guaranteed for the digital still camera CAM as well, by installing the zoom lens ZL of Example 3.

According to each example, a zoom lens and an optical apparatus (digital still camera) which has an jackal optical performance with a wide-angle lens, a large aperture ratio and a high zoom ratio can be implemented.

In the above embodiment, the following content can be adapted within a range where the optical performance is not diminished.

In each example, the zoom lens comprised of three lens groups was shown, but the present invention can also be applied to a configuration using a different number of lens groups, such as four groups. In the configuration, a lens or a lens group may be added to the side closest to the object, or a lens or a lens group may be added to the side closest to the image. A "lens group" refers to a portion having at least one lens isolated by an air space which changes upon zooming.

A single or a plurality of lens group(s) or a partial lens group may be designed to be a focusing lens group which performs focusing from an object at infinity to an object at short distance by moving in the optical axis direction. This focusing lens group can be applied to auto focus, and is also suitable for driving a motor for auto focusing (driving using an ultrasonic motor). It is particularly preferable that the third lens group is designed to be the focusing lens group.

A lens group or a partial lens group may be designed to be a vibration-isolating lens group, which corrects image blurs generated by hand motion by moving the lens group or the partial lens group in a direction orthogonal to the optical axis or rotating (oscillating) the lens group or the partial lens group in an in-plane direction including the optical axis. It is particularly preferable that at least a part of the second lens group is designed to be the vibration-isolating lens group.

The lens surface may be formed to be a spherical surface or a plane, or an aspherical surface. If the lens surface is a spherical surface or a plane, lens processing, assembly and adjustment are easy, and deterioration of optical performance, due to an error in processing, assembly and adjustment, can be prevented. Even if the image plane is shifted, the drawing performance is not affected very much, which is desirable. If the lens surface is an aspherical surface, the aspherical surface can be any aspherical surface out of an aspherical surface generated by grinding, a glass molded aspherical surface generated by forming glass in an aspherical shape using a die, and a composite aspherical surface generated by forming resin on the surface of the glass to be an aspherical shape. The lens surface may be a diffraction surface, and the lens may be a refractive index distributed lens (GRIN lens) or a plastic lens.

It is preferable that the aperture stop is disposed near the second lens group, but the role of the aperture stop may be substituted by the frame of the lens, without disposing a separate element as the aperture stop.

Each lens surface may be coated with an antireflection film which has high transmittance in a wide wavelength region, in order to decrease flares and ghosts, and implement a high optical performance with high contrast.

The zoom ratio of the zoom lens (zooming optical system) of the present embodiment is about 3 to 10.

In the zoom lens (zooming optical system) of the present embodiment, it is preferable that the first lens group has one positive lens component and one negative lens component. It is preferable that the second lens group has three positive lens components and one negative lens component. It is preferable that the third lens group has one positive lens component.

The zoom lens (zooming optical system) of the present embodiment is used for a digital still camera, but the present invention is not limited to this, but may also be used for other optical apparatuses, such as a digital video camera.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens comprising, in order from an object: a first lens group having negative refractive power; a second lens group having positive refractive power; and a third lens group having positive refractive power, upon zooming from a wide-angle end state to a telephoto end state, at least the first lens group and the second lens group moving along an optical axis so that a distance between the first lens group and the second lens group decreases, and a distance between the second lens group and the third lens group increases, the lens closest to the object in the second lens group being a positive single lens, the object side lens surface of the positive single lens being an aspherical surface of which radius of curvature increases in a direction from the optical axis to the periphery of the lens, and the following conditional expression being satisfied:

$$0.018 < X \times Y\max/(fw \times TLw) < 0.040$$

where X denotes a sag within an effective diameter on the object side lens surface of the positive single lens, Ymax denotes a maximum image height of the zoom lens in the wide-angle end state, fw denotes a focal length of the zoom lens in the wide-angle end state, and TLw denotes a total length of the zoom lens in the wide-angle end state.

2. The zoom lens according to claim 1, wherein the following conditional expression is satisfied:

$$0.70 < f2F/f2 < 1.20$$

where f2F denotes a focal length of the positive single lens closest to the object in the second lens group, and f2 denotes a focal length of the second lens group.

3. The zoom lens according to claim 1, wherein the following conditional expressions are satisfied:

$2.60<Nd+(0.02\times vd)<3.00$; and $1.65<Nd<1.85$ where Nd denotes a refractive index of the positive single lens closest to the object in the second lens group, and vd denotes an Abbe number of the positive single lens closest to the object in the second lens group.

4. The zoom lens according to claim 1, wherein the following conditional expression is satisfied:

$1.30<ft/(-f1)<2.10$ where ft denotes a focal length of the zoom lens in the telephoto end state, and f1 denotes a focal length of the first lens group.

5. The zoom lens according to claim 1, wherein the first lens group comprises, in order from the object, one negative lens and one positive lens.

6. The zoom lens according to claim 1, wherein the lens closest to the object in the first lens group has an aspherical surface.

7. The zoom lens according to claim 1, wherein the second lens group comprises, in order from the object, a first positive lens which is the positive single lens closest to the object in the second lens group, a second positive lens, and a negative lens.

8. The zoom lens according to claim 1, wherein the second lens group comprises, in order from an image, a positive lens and a negative lens.

9. The zoom lens according to claim 1, wherein at least a part of the lenses in the second lens group is movable in a direction orthogonal to the optical axis.

10. The zoom lens according to claim 1, wherein the third lens group is fixed on the optical axis upon zooming from the wide-angle end state to the telephoto end state.

11. An optical apparatus comprising a zoom lens for forming an image of an object on a predetermined surface, the zoom lens being the zoom lens according to claim 1.

12. A method for manufacturing a zoom lens by disposing, in order from an object, a first lens group having negative refractive power, a second lens group having positive refractive power, and a third lens group having positive refractive power, the method comprising disposing the first to third lens groups such that, upon zooming from a wide-angle end state to a telephoto end state, at least the first lens group and the second lens group move along an optical axis so that a distance between the first lens group and the second lens group decreases, and a distance between the second lens group and the third lens group increases, the lens closest to the object in the second lens group being a positive single lens, the object side lens surface of the positive single lens being an aspherical surface of which radius of curvature increases in a direction from the optical axis to the periphery of the lens, and the following conditional expression being satisfied:

$0.018<X\times Ymax/(fw\times TLw)<0.040$ where X denotes a sag within an effective diameter on the object side lens surface of the positive lens, Ymax denotes a maximum image height of the zoom lens in the wide-angle end state, fw denotes a focal length of the zoom lens in the wide-angle end state, and TLw denotes a total length of the zoom lens in the wide-angle end state.

13. The method for manufacturing a zoom lens according to claim 12, wherein the following conditional expression is satisfied:

$0.70<f2F/f2<1.20$ where f2F denotes a focal length of the positive single lens closest to the object in the second lens group, and f2 denotes a focal length of the second lens group.

14. The method for manufacturing a zoom lens according to claim 12, wherein the following conditional expressions are satisfied:

$2.60<Nd+(0.02\times vd)<3.00$; and $1.65<Nd<1.85$ where Nd denotes a refractive index of the positive single lens closest to the object in the second lens group, and vd denotes an Abbe number of the positive single lens closest to the object in the second lens group.

15. The method for manufacturing a zoom lens according to claim 12, wherein the following conditional expression is satisfied:

$1.30<ft/(-f1)<2.10$ where ft denotes a focal length of the zoom lens in the telephoto end state, and f1 denotes a focal length of the first lens group.

16. A zoom lens comprising, in order from an object: a first lens group having negative refractive power; a second lens group having positive refractive power; and a third lens group having positive refractive power, upon zooming from a wide-angle end state to a telephoto end state, at least the first lens group and the second lens group moving along an optical axis so that a distance between the first lens group and the second lens group decreases, and a distance between the second lens group and the third lens group increases, the lens closest to the object in the second lens group being a positive lens, the object side lens surface of the positive lens being an aspherical surface of which radius of curvature increases in a direction from the optical axis to the periphery of the lens, the following conditional expression being satisfied:

$0.018<X\times Ymax/(fw\times TLw)<0.040$ where X denotes a sag within an effective diameter on the object side lens surface of the positive lens, Ymax denotes a maximum image height of the zoom lens in the wide-angle end state, fw denotes a focal length of the zoom lens in the wide-angle end state, and TLw denotes a total length of the zoom lens in the wide-angle end state, and the following conditional expression being satisfied:

$0.70<f2F/f2<1.20$ where f2F denotes a focal length of the positive lens closest to the object in the second lens group, and f2 denotes a focal length of the second lens group.

17. A method for manufacturing a zoom lens by disposing, in order from an object, a first lens group having negative refractive power, a second lens group having positive refractive power, and a third lens group having positive refractive power, the method comprising disposing the first to third lens groups such that, upon zooming from a wide-angle end state to a telephoto end state, at least the first lens group and the second lens group move along an optical axis so that a distance between the first lens group and the second lens group decreases, and a distance between the second lens group and the third lens group increases, the lens closest to the object in the second lens group being a positive lens, the object side lens surface of the positive lens being an aspherical surface of which radius of curvature increases in a direction from the optical axis to the periphery of the lens, the following conditional expression being satisfied:

$$0.018 < X \times Y\text{max}/(fw \times TLw) < 0.040$$

where X denotes a sag within an effective diameter on the object side lens surface of the positive lens, Ymax denotes a maximum image height of the zoom lens in the wide-angle end state, fw denotes a focal length of the zoom lens in the wide-angle end state, and TLw denotes a total length of the zoom lens in the wide-angle end state, and the following conditional expression being satisfied:

$$0.70 < f2F/f2 < 1.20$$

where f2F denotes a focal length of the positive lens closest to the object in the second lens group, and f2 denotes a focal length of the second lens group.

* * * * *